United States Patent [19]
Murray, Jr.

[11] 3,969,093
[45] July 13, 1976

[54] CYCLONIC GAS SCRUBBING SYSTEM
[75] Inventor: Daniel N. Murray, Jr., Erie, Pa.
[73] Assignee: Hammermill Paper Company, Erie, Pa.
[22] Filed: Nov. 5, 1974
[21] Appl. No.: 521,147

Related U.S. Application Data
[63] Continuation of Ser. No. 321,777, Jan. 8, 1973, abandoned.

[52] U.S. Cl. .................................. 55/229; 55/230; 55/236; 55/238; 55/260; 55/338; 55/355; 55/425; 55/460; 261/79 A; 261/88
[51] Int. Cl.² .................................. B01D 47/00
[58] Field of Search ...... 55/225, 229, 230, 235–238, 55/257, 258, 260, 338, 355, 394, 423–426, 460; 261/83–85, 88, 89, 79 A

[56] References Cited
UNITED STATES PATENTS

| | | | |
|---|---|---|---|
| 1,138,460 | 5/1915 | Derby | 55/236 |
| 2,259,033 | 10/1941 | Fisher | 55/235 X |
| 2,574,370 | 11/1951 | Bailey | 55/338 |
| 2,788,087 | 4/1957 | Lenehan | 55/338 |
| 2,888,096 | 5/1959 | Evans | 55/338 |
| 3,251,176 | 5/1966 | Gleason | 55/355 |
| 3,347,535 | 10/1967 | Schimpke | 55/260 X |
| 3,524,631 | 8/1970 | Mare | 55/257 X |
| 3,693,326 | 9/1972 | Deane | 55/230 |
| 3,884,656 | 5/1975 | Deane | 55/257 |

FOREIGN PATENTS OR APPLICATIONS

| | | | |
|---|---|---|---|
| 695,264 | 9/1964 | Canada | 55/230 |
| 785,917 | 8/1935 | France | 55/238 |
| 329,779 | 11/1920 | Germany | 55/460 |
| 980,724 | 1/1965 | United Kingdom | 55/237 |

Primary Examiner—Frank W. Lutter
Assistant Examiner—Kathleen J. Prunner
Attorney, Agent, or Firm—Fitch, Even, Tabin & Luedeka

[57] ABSTRACT

A cyclonic gas cleaning system is described having an elongated rotary spray header mounted centrally of an elongated housing coextensive therewith. Gas circulates helically upward within the housing while the spray header rotates and sprays a scrubbing fluid into the gas.

7 Claims, 7 Drawing Figures

CYCLONIC GAS SCRUBBING SYSTEM

This application is a continuation of application, Ser. No. 321,777, filed Jan. 8, 1973, and now abandoned, and relates to the cleaning of gas such as flue gas and other industrial waste gas. More particularly, the invention relates to an improved cyclonic gas cleaning system. su With the increasing stringency of air pollution laws, the development of effective and efficient systems for cleaning industrial gases and the like has assumed increased improtance. Gas cleaning systems are known in the art which employ means to impart a cyclonic swirl to the gas being cleaned. This added component of velocity results in heavier particles moving to the outside of the gas stream where they are more readily intercepted and removed. Other types of systems may employ the so-called gas-scrubbers in which the flowing gas is intercepted by a high energy stream of liquid. This imparts a new component of velocity to the particles entrained in the gas due to collision thereof by particles of liquid, and adds to the mass of particles entrained in the gas by hydrostatic action, thereby increasing the tnedency for particles to move out of the flowing gas stream. Systems combining both cyclonic separation equipment and gas scrubbing equipment in series have also been designed.

Prior art gas cleaning systems of the general type described have suffered from certain disadvantages. Among these disadvantages are that the devices have not been as efficient as desired to remove a maximum amount of pollution from the gas, and also that particles moving to the outside of the gas stream sometimes have a tendency to re-enter the gas stream to once again be entrained therein. Often, prior art gas cleaning systems were not capable of efficient operation over a wide range of gas flow rates, such as might be encountered in the operation of a boiler system. A further disadvantage of prior art devices is that often the gas passing therethrough would short-circuit, that is, would move through the cleaning system more repidly than desirable for a full and complete exposure to the operation of the cleaning system.

It is an object of the present invention to provide an improved gas cleaning system which is free of the foregoing mentioned disadvantages, as well as other disadvantages, exhibited by prior art systems.

Another object of the invention is to provide a highly efficient gas cleaning system.

Another object of the invention is to provide a gas cleaning system in which gas scrubbing and cyclonic separation are combined contemporaneously in a single highly efficient unit.

Other objects of the invention will become apparent to those skilled in the art from the following description, taken in connection with the accompanying drawings wherein.

Very generally, the cyclonic gas cleaning system of the invention comprises an elongated housing 11 and an elongated spray header 12 mounted centrally of the housing coextensive therewith. A gas inlet duct 13 and a gas outlet duct 14 are positioned at opposite ends of said housing tangential to the interior thereof to impart a generally helical flow to gas passing from the inlet duct to the outlet duct in the space between the spray header and the housing. Means 16 are provided for conducting a scrubbing fluid to the spray header. Means 17 and 18 are provided supporting the spray header for rotation relative to the housing.

Figure 1:
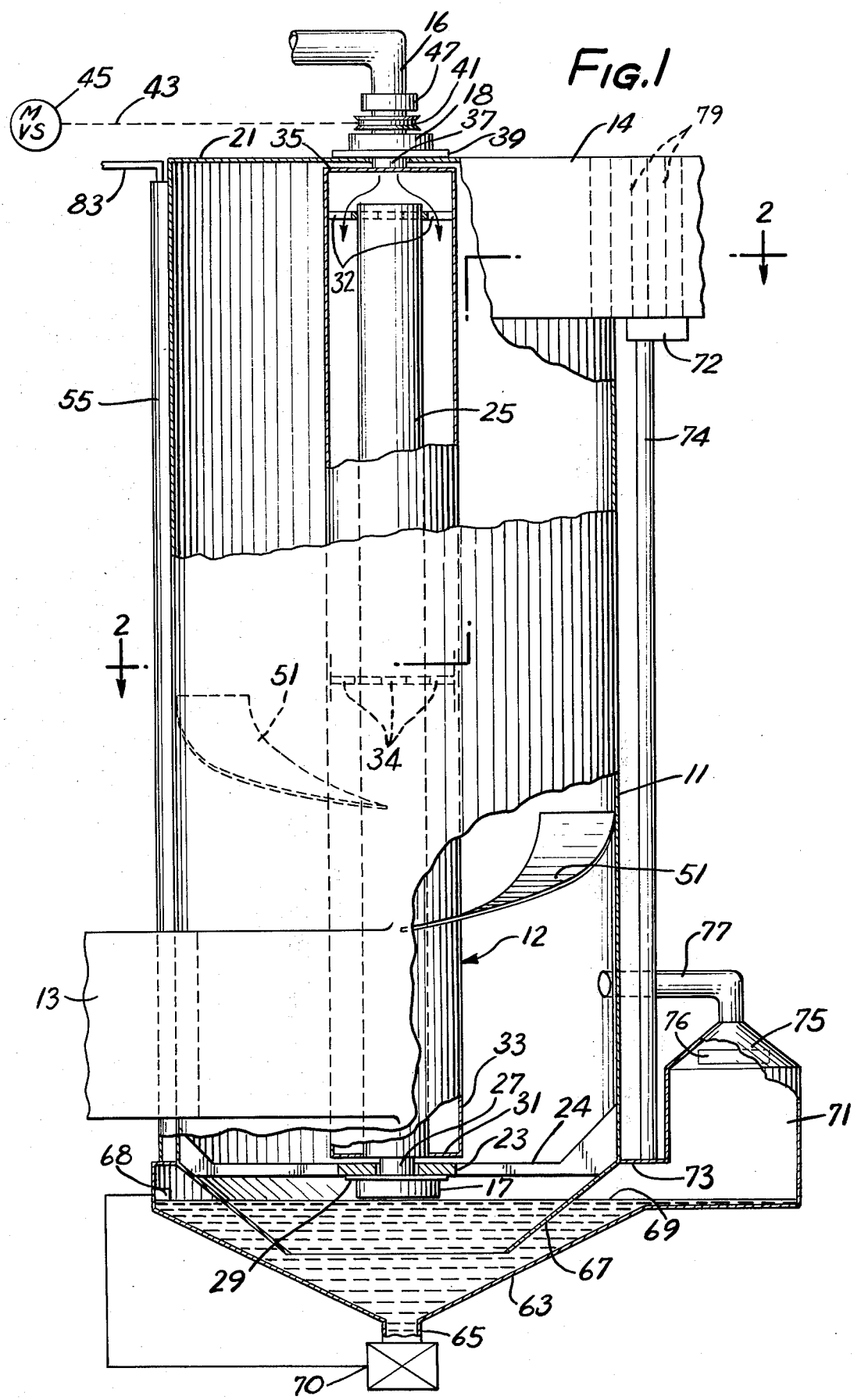
FIG. 1 is a schematic elevational view, with parts broken away, of a gas cleaning system constructed in accordance with the invention.

Referring now more particularly to FIG. 1, the cyclonic gas cleaning system of the invention is illustrated in partial section. The elongated housing is a generally cylindrical tank of steel or other suitable material. The top of the tank is closed by a plate 21, and the bottom of the tank is open. A boss 23 is supported in the open lower end of the tank by a plurality of struts 24 which project radially inward from the walls of the tank 11.

An elongated spray header is mounted centrally of the housing coextensive therewith. More particularly, the elongated spray header comprises a central tube 25 mounted at its lower end on an axle 27 which extends through the boss 23 into a bearing and seal assembly 17. The assembly 17 is mounted to the boss 23 by a mounting plate 29. An annular wall 31 extends radially outward from the tube 25 at the lower end thereof to the lower end of a cylinder 33 which extends coextensively with and coaxially with the tube 25. In the annular space between the central tube 25 and the cylinder 33, reinforcing struts 32 and 34 are provided near the top and mid-point, respectively, of the central tube 25.

The upper end of the cylinder 33 projects beyond the upper end of the tube 25 and is closed by a wall 35. An axle 37 supports the cylinder 33 and extends upwardly through the plate 21 into a bearing and seal assembly 18, which is mounted to the top plate 21 on a mounting plate 39. The shaft 37 is hollow and passes through the assembly 18 to a drive pulley 41. Torque applied to the drive pulley 41 by a suitable belt, shown schematically at 43, from a variable speed and direction drive 45 enables rotation of the spray header at a desired direction and speed.

The upper end of the hollow shaft 37 terminates in a rotary joint or coupler 47. A fluid conduit 16 also is connected to the rotary joint or coupler 47 and is thereby capable of conducting fluid through the hollow shaft 37 and into the annulus between the tube 25 and the cylinder 33. As is known in the art, the cylinder 33 is provided with a plurality of nozzle type spray openings (not shown) and, upon a sufficient build-up of pressure within the aforementioned annulus, spray is emitted horizontally or radially from the spray header to pass across the region between the spray header 12 and the housing or tank 11 to impinge upon the inner wall of the housing 11.

The gas inlet duct 13 is positioned just above the lower end of the tank 11 and projects tangentially therefrom. Similarly, the gas outlet duct 14 is positioned at the upper end of the tank 11 oriented tangentially thereto. Gas entering the inlet duct 13 at a suitably high pressure will pass into the tank 11 and swirl upwardly in a generally helical path until it emerges from the outlet duct 14. It is this cyclone-like path from which the term "cyclonic gas cleaning system" is derived. To aid in maintaining the proper gas flow, and prevent "short circuiting", a plurality of baffles 51 may be provided internally of the tank 11. The number, size, and direction of the baffles are selected in accordance with the operating parameters of the system.

As the scrubbing fluid is sprayed out of the rotary spray header and crosses the space between the spray header and the tank 11, the liquid impinges upon particles entrained in the gas. The increase in energy or mass imparted to the thus intercepted particles causes the particles to move to the outside of the gas stream and impinge on the wall of the tank 11, forming a slurry. Means are provided on the housing or tank 11 for collecting the particles impinging upon the interior wall of the housing by collecting the slurry formed thereby. Several different configurations of such means are shown in FIG. 2 for representative purposes.

Figure 2:
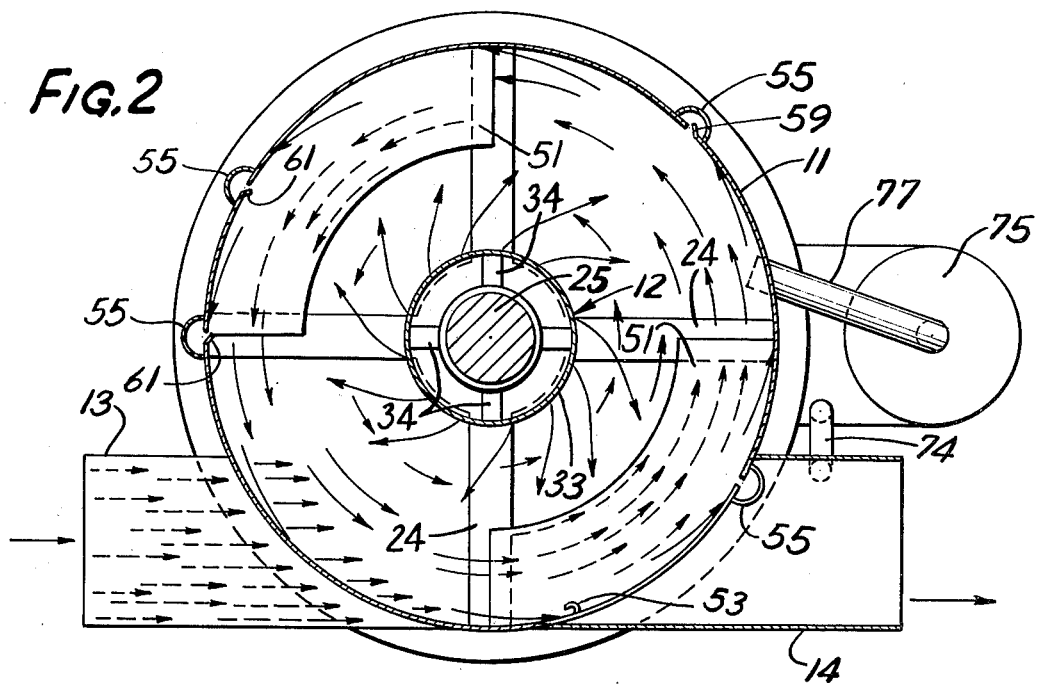
FIG. 2 is a sectional view taken along the line 2—2 of FIG. 1.
Figure 5:
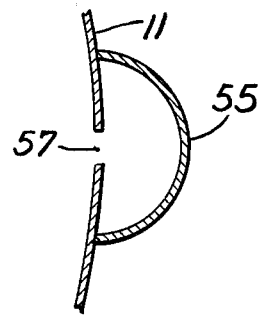
Figure 6:
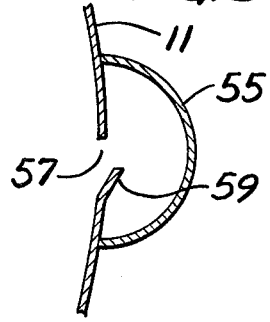
Figure 7:
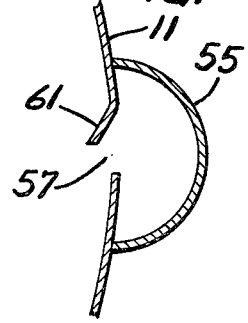

FIGS. 4, 5, 6 and 7 illustrate in detail the various forms or configurations which may be used for the collecting means in FIG. 2. More particularly, in FIG. 4, the collecting means comprise a curved vane 53 projecting inwardly from the wall of the housing 11 and running down the wall the full length thereof. Slurry is captured by the vane and runs downwardly due to gravity. In FIGS. 5, 6 and 7, downcomer or collection headers 55 are used mounted exteriorly of the housing and extending axially thereof substantially the full length of the housing. An elongated slot or opening 57 is provided in the wall of the housing to provide communication between the collection headers 55 and the interior of the housing. To facilitate capturing the slurry, vanes may be provided adjacent the slot, such as the vane 59 in FIG. 6, which extends inwardly into the header, or such as the vane 61 in FIG. 7 which extends inwardly into the housing 11. In all three cases, the slurry is collected within the header and runs downwardly due to the force of gravity toward the bottom of the housing 11.

In order to collect the slurry moving down the collection headers 55 or the vanes 53, a slurry collection hopper of reservoir 63 is provided (see FIG. 1). The reservoir 63 is generally frustoconical in shape and is connected to the lower end of the housing 11 as shown. The reservoir 63 is provided with a central drain connection 65 from which thr slurry is removed from the reservoir and otherwise disposed of.

In the case of a system utilizing the external downcomer headers 55, the frustoconical reservoir 63 is connected to the lower end of the housing 11 such that the lower ends of the downcomer headers 55 are in open communication with the reservoir, as shown in FIG. 1. A frustoconical vacuum seal ring 67 is mounted within the hopper of reservoir 63 to extend below the normal level of liquid or slurry in the reservoir, indicated by the line 69. The vacuum seal ring 67 is connected at its upper annular edge to the lower generally annular edge of the housing 11 to establish an annular region between the seal ring 67 and the reservoir wall 63, which region is above the liquid or slurry level in the reservoir and is in flow communication with the lower ends of the downcomer headers 55. In this manner, the vacuum seal ring 67 provides a pressure barrier between the collection or dwoncomer headers and the open region at the bottom of the housing 11. Liquid level is sensed by a suitable commercially available liquid level controller, shown schematically at 68. The controller 68 regulates an air-operated valve 70 at the drain connection 65 to maintain the liquid level above the lower edge of the seal ring 67.

As the purified gas reaches the gas outlet duct 14, further purification may be effected by removing any mist in the gas. In order to accomplish this, an array of demisters 79, comprising suitable demisting devices, is provided at the outlet end of the gas outlet duce 14. Drainage therefrom is collected in a pan 72 and drained through a drain pipe 74 which is connected at its lower end to the region between the seal ring 67 and the reservoir wall 63.

As might be expected, during collection of slurry through the passages 57, a certain quantity of gas also passes into the headers 55. To minimize re-entrainment and to insure that such gas is properly cleaned before being discharged, an aspirator system is provided. This includes a gas collecting chamber 71 which communicates through a duct 73 with the region above the liquid 69 in the collecting hopper 63 and outside of the vaccum seal ring 67. A frustoconical housing 75 is provided on the tip of the gas collecting chamber 71, and the housing 75 contains a suitable aspirator, indicated schematically at 76. Gas discharged by the aspirator is passed through a gas return line 77 into a region early in the flow path of the gas through the housing 11. This insures that any gas being passed through the collection headers 55 will be recirculated into the main unit for proper cleaning. It also maintains a pressure gradient from the housing through the header and the collection chamber to the gas collecting chamber 71, thereby insuring a flow of the slurry and gas for collection purposes.

Figure 3:
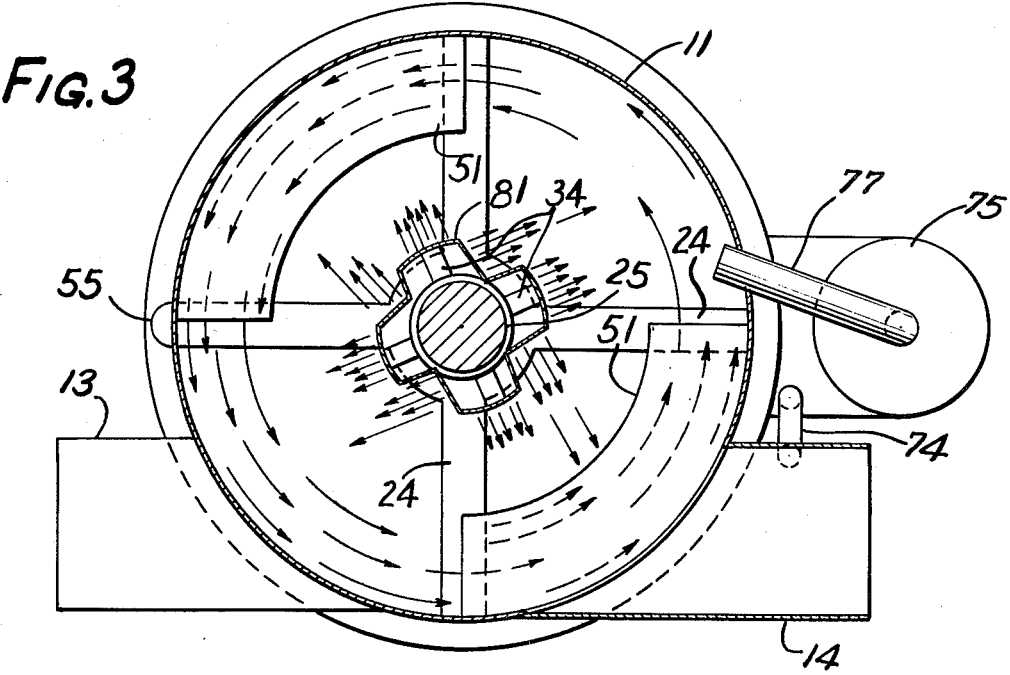
FIG. 3 is a sectional view similar to that of FIG. 2 illustrating an alternative embodiment of the invention.
Figure 4:
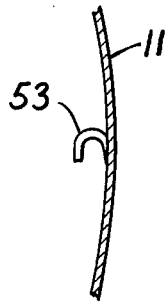
FIGS. 4, 5, 6 and 7 are enlarged detail views of alternate configurations of portions of the system of the invention, illustrated in FIG. 2.

To insure that there is no short-circuiting of gas, that is, to insure that portions of the gas do not flow along other than helical paths in which the gas is not as easily purified, thhe rotating spray header 12 may have a non-circular outer surface configuration. One such design is shown in FIG. 3 in which the rotating spray header is provided with a non-circular outer wall 81 resulting in a cross-shaped cross section for the spray header. Upon rotation, a turbulence is produced in the flowing gas, explained in greated detail below.

In operating the system of the invention, the scrubbing media, which may be any suitable fluid, is blasted into the helically or cycloically swirling gases by means of the rotating spray header. The scrubbing media and the pollutants entrained in the gas react to form minute droplets of slurry. Due to the kinetic forces present, the driplets begin immediately to separate from the gases and impact on the wall of the separator and form into a thin layer of slurry. This occurs due to the centrifugal forces acting on the particles entrained in the gas, and to the energy imparted to the particles or forming droplets by the injected scrubbing media. The quantity and viscosity of the scrubbing media are selected so that the viscosity of the slurry which forms on the interior wall of the housing is such that the slurry will creep along the wall of the housing due to the drag effect of the gas and be forced through the slots or orifices 57 or be intercepted by the vanes 53, depending upon the configuration selected. The number of vanes or orifices and their size and spacing are selected so as to remove the maximum amount of slurry while minimizing gas loss through the slots 57. The slurry then drains to the region of the reservoir 63 above the liquid level 69 and outwardly from the seal ring 67 and the gases are siphoned by the aspirator unit and returned to the main gas flow. Accordingly, only clean gas is discharged from the system.

In many industrial systems in which waste gases are discharged, the flow of the waste has may vary considerably. For example, in the case of boilers, wide swings in load demand may cause correspondingly wide swings in the amount of waste gases discharged therefrom. The system of the invention is readily capable of taking these swings into account because of the variability of speed and direction of the rotating spray header. This versatility allows the spray header to be rotated at the proper speed to optimize the impact between the scrubbing media and the pollutants in the gases.

In order to select the speed at which the rotating spray header is to be operated, and the direction in which it is to be rotated, the optimum pressure drop across the system is determined by utilizing suitable commercial pressure sensing instruments. A feedback system can be used to control the speed and drive of the variable speed drive unit. Since the pressure drop across the system is a measure of the energy consumed thereby, proper setting of the sensing instruments enables automatic operation of the system at maximum efficiency.

By using a non-circular shaped spray header as shown in FIG. 3, any tendency for the gas to channel from point of entry up the center of the unit to the point of exit is minimized. This is because the non-circular surface creates a pulsing action in the inner layer of gases, thereby driving the forming droplets of slurry out into the higher velocity stream for separation from the gases. Thus, gases near the center of the system, which is normally the quiet zone, can not channel up through this region and escape the high scrubbing-separating action adjacent the wall of the housing 11. The turbulent action created by the non-circular shaped spray header for the full length of the system imparts a swirling and tumbling action to the gas so as to create a constant interchange between the inner region and the outer region of the gas stream. This provides each particle of slurry with many opportunities to pass through the region of high scrubbing-separating action, and to impinge upon the wall and be driven into a collecting slot or vane.

In order to continuously flush the collection headers, the headers may be provided with a sutiable flush line 83. The flush lines 83 are adapted to introduce a suitable flushing fluid downwardly into the collection headers 55 and prevent plugging of the headers and blocking of the bleedoff slots or orifices 57.

Due to the open bottom of the housing 11, and the contral opening in the frustoconical seal ring 67, slurry on the walls of the housing which is not intercepted by the vanes 53 or by one of the slots 57 may drain down the walls by gravity into the reservoir 63.

It may therefore be seen that the invention provides an improvides an improved cyclonic gas cleaning system. Scrubbing and separating is accomplished in the same basic unit, and the system is capable of handling a wide variation in the range of flow rates of gas being cleaned. The system operates with a very high cleaning efficiency and may be readily adapted for a wide variety of pollutant conditions.

Various modifications of the invention in addition to those shown and described herein will become apparent to those skilled in the art from the foregoing description and accompanying drawings. Such modifications are intended to fall within the scope of the appended claims.

What is claimed is:

1. A cyclonic gas cleaning system comprising, in combination, an elongated housing, an elongated spray header mounted centrally of said housing coextnesive therewith, a gas inlet duct and a gas outlet duct at opposite ends of said housing and being tangential to the interior thereof to impart a generally helical flow of gas passing from said inlet duct to said outlet duct in the space between said spray header and said housing, means for conducting a scrubbing fluid to said spray header, means supporting said spray header for rotation relative to said housing, means for effecting rotation of said spray header, a plurality of elongated collection headers extending axially along the exterior of said housing, a plurality of slots opening into said housing from said headers, said housing having an open region at its lower end, means associated with said housing and said collection headers and defining a closed reservoir for receiving particles and gases entering said headers, means between the lower ends of said collection headers and said open region of said housing for isolating said gases received within said reservoir from said collection headers from direct communication with said open region of said housing, and means associated with said reservoir for effecting reentry of gases received within said reservoir from said collection headers into said housing for passage toward said outlet duct in said helical flow.

2. A system according to claim 1 wherein said means for effecting reentry of gases from said reservoir into said housing includes means for maintaining a pressure gradient from said housing through said collection headers to said reservoir so as to insure a flow of particles and gases from said headers to said reservoir.

3. A system according to claim 1 wherein said means for effecting entry of gases from said reservoir into said housing includes a gas collecting chamber communicating with said reservoir, and a gas return line communicating with said collecting chamber and said housing to return gas from said collecting chamber to said housing.

4. A system as defined in claim 1 wherein said means for isolating said gases within said reservoir includes a fluid disposed within said reservoir, and vacuum seal means associated with said housing and extending within the fluid within said reservoir in a manner to prevent direct flow of gas from said collection headers into said open region of said housing.

5. A cyclonic gas cleaning system comprising, an elongated housing, an elongated spray header mounted centrally of said housing along the axis thereof, a gas inlet duct and a gas outlet duct at opposite ends of said housing and being tangential to the interior thereof to impart a generally helical flow to gas passing from said inlet duct to said outlet duct in the space between said spray header and said housing, means for conducting a scrubbing fluid to said spray header, means for supproting said spray header for rotation relative to said housing, means associated with said spray header for varying the speed and direction of rotation of said spray header, a plurality of elongated collection headers extending axially along the outside of said housing and having slots opening into said housing, said housing having an open region at its lower end, means associated with said housing and said collection headers and defining a closed reservoir for receiving solid and gas particles entering said collection headers, means between the lower ends of said collection headers and siad open region of said housing for isolating said gases received within said reservoir from said collection headers from direct communication with said open region of said housing, and means associated with said reservoir for effecting reentry of gases received within said reservoir from said collection headers into the interior of said housing for passing said gases into the flow of gas within said housing from said inlet duct to said outlet duct.

6. A system according to claim 5 wherein said last mentioned means includes a gas collecting chamber connected with said reservoir, a gas return line communicating with said gas collecting chamber and with the interior of said housing to return gas to siad housing, and means for maintaining a pressure gradient from said housing through said collection headers through said reservoir and through said gas return line in a manner to return gas from said reservoir to said housing.

7. A system according to claim 5 wherein the outer surface of said spray header has a non-circular configuration and is adapted to impart a turbulence to the gases adjacent said spray header as said gases pass from said inlet duct to said outlet duct.

* * * * *